(12) United States Patent
Wiebush, III

(10) Patent No.: US 9,752,719 B2
(45) Date of Patent: Sep. 5, 2017

(54) COMPUTING DEVICE HOLDER

(71) Applicant: Le Moey Wiebush, III, Corpus Christi, TX (US)

(72) Inventor: Le Moey Wiebush, III, Corpus Christi, TX (US)

(*) Notice: Subject to any disclaimer, the term of this patent is extended or adjusted under 35 U.S.C. 154(b) by 0 days.

(21) Appl. No.: 15/008,542

(22) Filed: Jan. 28, 2016

(65) Prior Publication Data
US 2017/0219159 A1    Aug. 3, 2017

(51) Int. Cl.
| F16M 11/00 | (2006.01) |
| F16M 11/22 | (2006.01) |
| G06F 1/16 | (2006.01) |

(52) U.S. Cl.
CPC ........... F16M 11/22 (2013.01); G06F 1/1613 (2013.01)

(58) Field of Classification Search
CPC . F16M 11/22; G06F 1/1613; A47B 2023/045; A47B 23/046; A47B 2023/048; A47B 2023/049; A47B 23/042
USPC ............................ 248/441.1, 451, 456; 42/94
See application file for complete search history.

(56) References Cited

U.S. PATENT DOCUMENTS

| 4,873,777 A * | 10/1989 | Southard ................. F41A 23/18 211/64 |
| 5,337,985 A | 8/1994 | Hale |
| 6,352,233 B1 | 3/2002 | Barberich |
| 2005/0230126 A1 * | 10/2005 | Keeler ..................... A01L 11/00 168/44 |
| 2006/0262497 A1 * | 11/2006 | Jahlokov ................ F16M 13/00 361/679.41 |
| 2009/0321605 A1 | 12/2009 | Petrie |
| 2010/0219302 A1 * | 9/2010 | Krasnicki ................ A45B 3/14 248/121 |

FOREIGN PATENT DOCUMENTS

CN           203784591         8/2014

* cited by examiner

*Primary Examiner* — Christopher E Garft
(74) *Attorney, Agent, or Firm* — M. Susan Spiering; Ferrell's PLLC

(57) ABSTRACT

Disclosed is a simple portable holder for holding electronic devices such as a laptop computer and a tablet. The holder can secure a laptop in a vertical (closed) position, or an open position. The holder includes a base, at least four posts and straps between the posts for holding the device. The straps between the posts form a substantial U-shaped area for stowage of the device while the device is in a closed position. The posts may have flat or curved profiles including a slanted or curved top portion thereof. The curvature at the top of the posts is used for securing the laptop while in an open position to the device holder. The holder may be placed on the floor to avoid clutter on a work surface, or for the convenience of the user having it near a seat.

19 Claims, 9 Drawing Sheets

COMPUTING DEVICE HOLDER

BACKGROUND

Field of the Invention

The present invention relates to a device holder. More particularly, the present invention relates to a device holder for holding a laptop computer.

Description of the Related Art

With the development of technology, large and bulky computers have evolved into small, light, and mobile devices such as laptop computers, mobile phones, tablets and the like. Thus, the presence of computers has expanded from office desks to living room sofas and other locations. The stowage of the mobile devices such as the laptop computers (hereafter called laptops) and the tablets may prove difficult while working from a bed, a chair, or a sofa, or when working in small or confined spaces. A purpose herein, for the present invention is to provide stowage for a laptop, when not in use where a table top or desk surface is unavailable or inconvenient.

In an office setting, a dedicated desk is generally available for laptops; however, in the home, this is often not the case. At home, laptops are often left on a seat or bed or on the floor where they are vulnerable to damage due to being sat upon, stepped on, or struck during floor cleaning activities such as vacuuming, mopping, sweeping, and the like. Further, many times, people want their laptops to remain operating while the computer is stowed for a short period of time, hence they do not wish to turn off or close the laptop. Thus, they leave the laptop open and running. If working from home, perhaps it is left on a bed, sofa, or chair. In this scenario, the vent ports of the laptop are often obstructed by pillows, blankets, and the like. Thus, there is a possibility of the laptop overheating. Overheating results in reduction of lifespan and possible failure of the laptop. Overheating may further result in the laptop and surrounding items catching fire.

Thus, there is a need for a laptop and tablet holder which overcomes the aforementioned drawbacks.

US patent application 2009/0321605 discloses a laptop holder that unfolds to create a sloped support to hold the laptop. The design makes minimal contact with the laptop case and further includes holes to allow ample ventilation. However, if used as a floor-standing holder, a laptop in this holder would not be within reaching distance from a seated position. If this holder were made taller, it would not provide a steady and firm support to the laptop. Further, as the laptop holder does not possess an optimum height, the laptop held on the holder is susceptible to damage by foot traffic and floor cleaners when placed on the floor. Moreover, the lateral orientation of this holder occupies excess floor space and is not compact for use near a chair or sofa.

U.S. Pat. No. 6,352,233 discloses a portable holder for a laptop. The laptop holder includes first and second members, attached to each other to form a support structure. Each of the members includes support portions that hold a laptop in a substantially vertical position. The holder can also hold a keyboard in a vertical position. However, the laptop is supported only when laid open at about a 180 degree angle. Further, the holder fails to support the laptop when the laptop is placed off-center. The rigidness and strength of the laptop holder is also questionable. Further, the holder is not suited for quick and frequent stowage and would be prone to tipping over.

Other device holders are disclosed in CN 203784591 that disclose a large screen phone and support frame for a flat computer or monitor. This device is intended for holding a tablet for regular use on a table top. While it could be used to stow a laptop or tablet on the floor, it would not provide an open position for laptops. Further, it would occupy excessive floor space and does not accommodate downward-directed connections. Also it provides no shock absorption for the device, needed for heavy, repeated use; CN 203564260 discloses a human breast CT (computed tomography) scanning device; U.S. Pat. No. 5,337,985 discloses a support device for a laptop computer; CN 202783292 discloses a tilting printed circuit board plug basket, and DE 3804102 discloses a device for double sided microfilming of books onto roll film or microfiche. These holders do not overcome the problems mentioned above, and would require in some cases excessive floor space, do not accommodate downward-directed connections, or would obstruct vent ports of a laptop computer. Further they would not possess shock absorbency properties.

FIGS. 1-3 illustrate prior art laptop holders that were located in the internet websites:

http://www.betterlivingthroughdesign.com/accessories/record-book-holder/ http://www.amazon.com/exec/obidos/ASIN/B002LARBWM/unclutterer-20/ https://unclutterer.com/2010/02/20/vertical-laptop-stands-save-desk-space/

While functional to hold a laptop, they do not provide adequate support for the laptop (and in some cases, associated cables and wires) while remaining on the floor, or within a defined, small space. FIG. 1 illustrates a book holder 100 that may alternately be used to hold a laptop. However, the holder 100 relies on friction or additional objects to hold the laptop in a vertical position as the laptop may slip when placed on the holder. Further, the base of this device is long and orthogonal to the laptop, preventing space-saving benefits. Note that even if the walls of holder 100 are brought closer together, the long base is still required to prevent the holder 100 from tipping over when a laptop is stowed in a closed position. Moreover, the holder 100 does not easily accommodate downward-directed cables and lacks shock absorption.

FIG. 2 illustrates a holder 200 made of copper tubing. However, the holder 200 only accommodates laptops in a closed position. Thus, the laptop cannot be used on the holder while in an open position. Further, the holder 200 does not elevate the laptop and is prone to tipping on one side. When placed on the floor, the holder 200 is subject to damage by floor traffic and floor cleaning activities. The holder 200 does not accommodate downward-directed cables and lacks shock absorption.

FIG. 3 illustrates a laptop holder 300 that tends to accommodate laptops of specific thickness. Like the holder 200, the holder 300 holds the laptop only in a closed position and is subject to damage by floor traffic and floor cleaning activities, when placed on the floor. The holder 300 also does not accommodate downward-directed cables and is prone to tipping.

Thus, there continues to exist a need for a laptop holder that holds the laptop in a manner such that the laptop is safe when placed on the floor, does not hamper the ventilation of the laptop, allows room for wires and cables associated with the laptop, allows the laptop to continue running while in a stowed position, and that overcomes the aforementioned drawbacks of conventional laptop holders.

SUMMARY

Disclosed is a simple, portable, electronic device holder, or more particularly a laptop computer holder which can be placed on the floor for stowage of the device. An object of the present invention is to provide a device holder that holds electronic devices such as a laptop, a tablet, or a mobile phone in different positions, i.e., an open or closed. The present device holder has a base, at least four posts supported by and secured onto the base, and straps between the posts to support the laptop or electronic device being supported thereon. The straps between the posts form a substantial U-shaped area for stowage of the laptop as well as the wiring or cable accessories associated with the laptop. The straps sufficiently elevate the laptop to protect it from elements and accidental foot traffic if left on the floor, and provide clearance for any downward-directed wires and cables. The laptop is placed between two sets of posts, over the strap. The posts are preferably curved in the top portion thereof, to guide the laptop and provide an additional secure position that allows a laptop to remain open and a tablet be placed in a viewable position.

BRIEF DESCRIPTION OF DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components which constitutes a device holder that securely holds a device such as a laptop, a mobile phone, and a tablet. Accordingly, the components and the method steps have been represented, showing only specific details that are pertinent for an understanding of the present invention so as not to obscure the disclosure with details that will be readily apparent to those with ordinary skill in the art having the benefit of the description herein.

Detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to utilize the present invention in virtually any appropriately detailed manner. Further, the terms and phrases used herein are not intended to be limiting but rather to provide a description of the invention.

Figure 1:
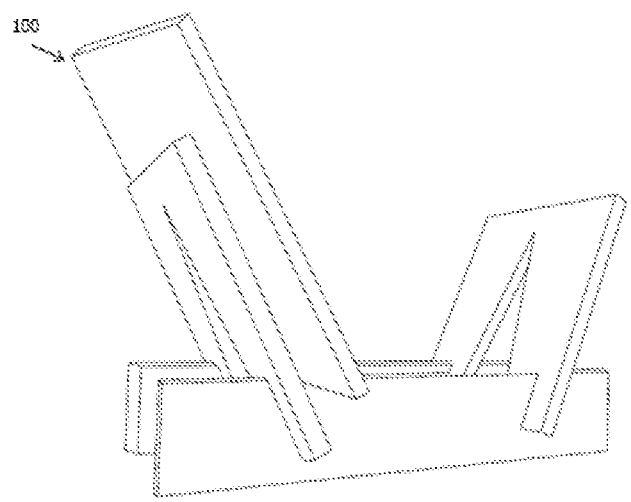
FIG. 1 illustrates a schematic representation of a prior art device holder.
Figure 2:
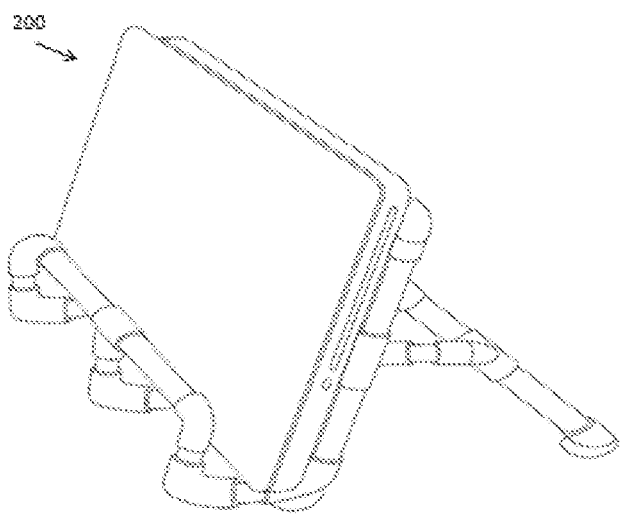
FIG. 2 illustrates a schematic representation of another prior art device holder.
Figure 3:
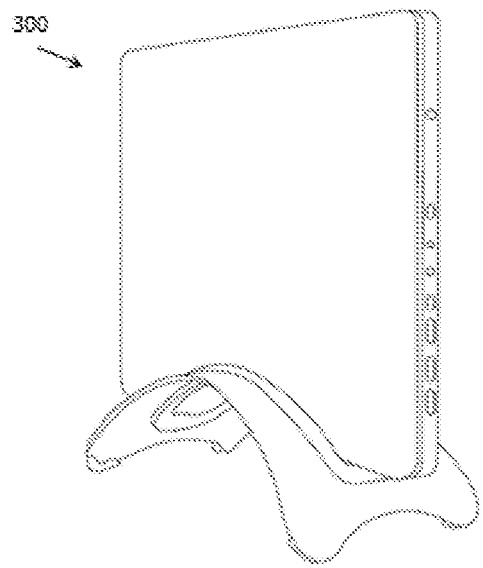
FIG. 3 illustrates a schematic representation of another prior art device holder.
Figure 4:
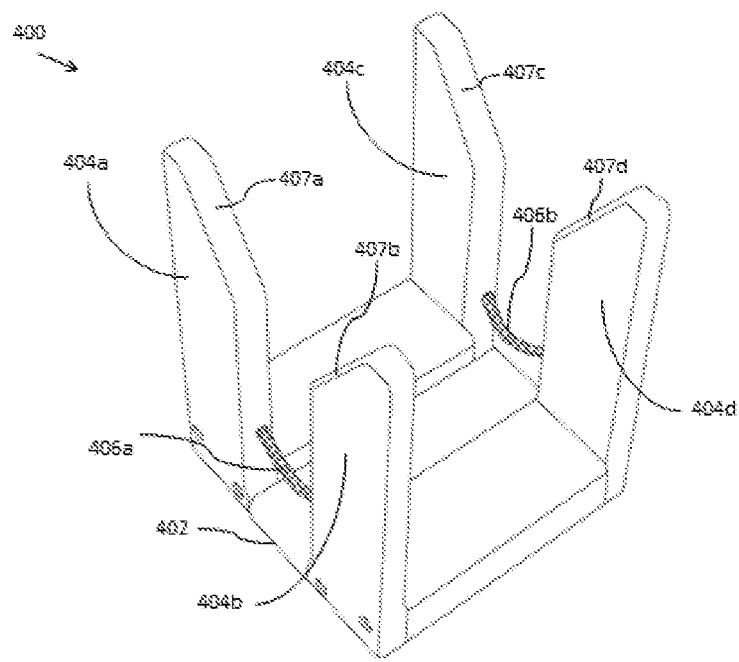
FIG. 4 illustrates a schematic representation of a device holder having straight edged posts with a slant on the inner top portion of the posts.

FIG. 4 discloses a perspective view of an embodiment of the present invention and illustrates a device holder 400. The holder 400 includes a base 402, four posts identified as first through fourth posts having straight edged upper regions 404a-404d (collectively referred to as posts 404), and first and second straps 406a and 406b (collectively referred to as straps 406). Each of the posts 404 has slant-like edges 407a-407d (collectively referred to as slant-like edges 407). The holder 400 holds devices such as a laptop computer (hereafter referred to as laptop), a mobile phone, and a tablet.

Figure 5:
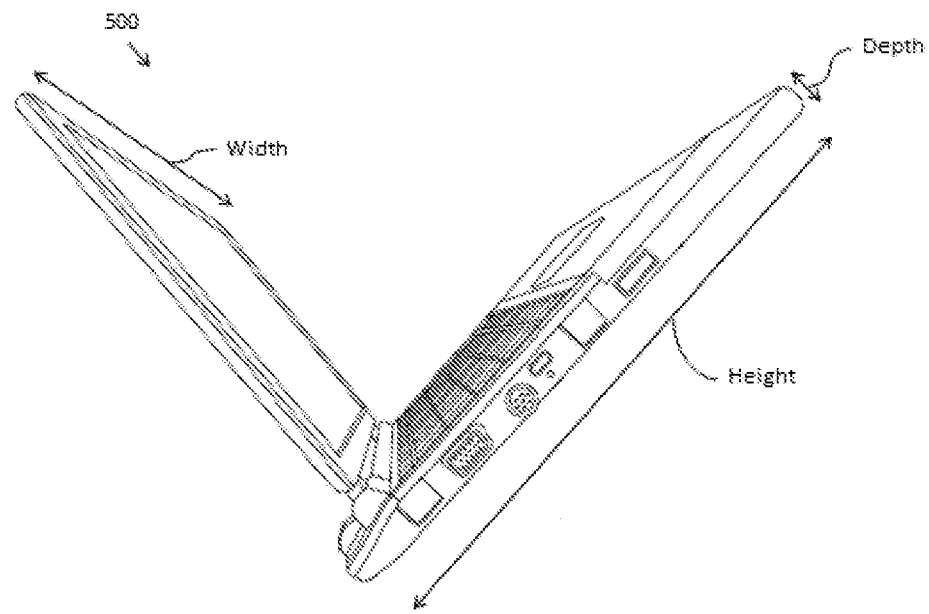
FIG. 5 is a schematic representation of a laptop indicating dimensions thereof.

FIG. 5 illustrates length, width and depth of a laptop 500 that the holder 400 holds. In general, the overall height of the device holder 400 is about 60% of the height of the largest supported laptop.

The device holder 400 is made of materials such as wood, plastic (sturdy rigid such as a polycarbonate or like), or metal. Sturdy metal is recommended such as chromium alloy, brass, nickel alloy, and steel including stainless steel, but other types may be used such as iron, aluminum, and rigid copper.

The posts 404 are attached to the base 402. In an embodiment of the present invention, the base 402 is a square base but can differ in shape provided the base dimensions are sufficient to support the laptop, or large enough to resist the whole holder 400 from tipping over when used with a large and/or heavy laptop. The shape of the base 402 can be square, rectangular, oval or otherwise as the user prefers. The weight of the base 402 depends on the geometry of the holder. It could range from 0.1 pounds (lbs) (wherein all the support is essentially derived from mechanical leverage) to 10 pounds (lbs). A typical base 402 that weighs about 1.5 pounds (lbs) can support a laptop that weighs up to about 7 pounds (lbs). Thus, in general, the weight of the base 402 is about 15% to 20% of the weight of the laptop. Resistance to tipping depends in part on post height, strap height, and holder construction. In an embodiment, each post (404a-404d) is placed at a corner of a rectangular base 402, equidistant from each other. Further, if the base 402 is circular or oval shaped (not shown), each of the posts 404 is placed on a periphery of the circular base at equidistant distances from each other. Alternatively the posts 404 can be offset (i.e., not equidistant) from each other provided they form a substantial U-shape holding section for securing the device in a closed position and accommodating the accompanying wires. In the offset post configuration, the posts are placed at a predetermined distance from each other.

The posts 404 can be secured to the base 402 by various means known to those of skill in the art. FIG. 4 illustrates the use of screws to secure the posts 404. However, glue, screws, dowels, or nails may be used. Further, mortise and tenon joints (not shown) can be used. The method of securing the posts 404 to the base 402 is based in part on user preference.

The width of the post 404, or post width can range from about 1.5" to about 3.0" with a preference for about 2" for each of the posts. The post width can vary based on the materials employed and user preference and needs. Generally, the width is based on safety consideration for safely securing and stowing the device in the holder, while maintaining the integrity of the holder. Sharp edges are not recommended to avoid personal injury. As such, the slant-like top edges 407 are somewhat rounded to reduce injury that may occur if a person were to fall on the holder.

The gap between the posts 404a and 404b, as well as the posts 404c and 404d should be sufficient to accommodate the thickest popular laptop without scrubbing or touching the posts 404 and having about a ⅛" minimum clearance between the device and the posts. Generally, the thickness of laptops vary from 1" to about 2". Too wide of a gap allows laptops to lean excessively and lose aesthetic appeal, plus the open position becomes unstable. Some "ruggedized" laptops can be thicker than 2" but most devices are about 1.5" and the trend is moving to thinner computer devices. Thus, an ideal gap between posts is about 1.75".

As shown in FIG. 4, the base 402 is a relatively heavy flat base with or without a central recess to provide additional clearance for downward-directed connectors. Alterations to the design include a lighter weight base 402 having a wider stance so as to resist tipping. Accordingly, a lighter weight base 402 may be made of plastic or polymeric material, thinner metals, or even plastic or light weight metal tubing which is welded or molded into a post and then forming a channel on a base and having straps between the posts 404 to hold the device of interest.

FIG. 4 shows the posts 404 having slant-like edges 407 and straight outer edges. The posts 404 can also have curved edges on the top portion of the post as well as the sides thereof. The laptop or tablet can be placed on the slant-like edges 407. FIG. 4 showing a slant top edge can hold the laptop in an open position.

The straps 406 are designed to be flexible and absorb shock when placing the laptop or tablet on the device holder 400. Straps 406 are placed between two posts 404 to form a U shape for placement of the laptop in a closed position. The straps 406 provide friction to prevent lateral sliding of the device.

The first strap 406a is attached between the first and second posts 404a and 404b. The second strap 406b is attached between the third and fourth posts 404c and 404d. The device in the closed position rests against the posts 404 and forms an angle with the posts 404. The straps 406 are placed at a height such that devices may be placed with connected cables facing downward without pinching cables or damaging connectors.

The straps 406 are placed far enough below the slant-like edges 407 of the posts 404 to provide a stable, maximum, device lean angle for all targeted devices. Thinner laptops lean more due to geometry (when the bottom is against the opposing posts). However, thinner laptops are usually lighter and remain stable at larger lean angles. With a 1.5 pound (lb), 6.5" wide base and a large laptop, oriented such that the battery is at the top, the maximum laptop lean angle stable enough for practical use is about 14 degrees from vertical. The minimum and ideal distance from the straps 406 to the slant-like edges 407 of the posts 404 is about two times (2×) the distance between the posts 404a and 404b and the distance between the posts 404c and 404d (also referred to as the post gap distance). Smaller lean angles may provide improved aesthetic appeal, but necessitate taller posts 404. It is recommended that the design of the holder result in lean angles between 0 and 14 degrees from vertical, and preferably no greater than about 10 degrees.

In an embodiment, the straps 406 are made of leather, but the materials for the straps can vary provided it is sturdy and absorbs shock and weight of the laptop. Examples of such materials include rubber, neoprene, nylon, faux leather, silicone, and other elastic polymers. The surface of the strap material should provide friction to prevent lateral slippage of the laptop. Most synthetic elastic cords do not work well for this application as it can cause the laptop to recoil and bounce out of the holder when dropped from a height of a few inches. Static rope is usable but not recommended as it has not been found to provide sufficient cushioning (or shock absorption) when a laptop is dropped into the holder. Leather or dynamic rope with a tacky covering are the preferred options for straps. For purposes herein, static rope is defined to have little or low elasticity.

The position of the straps 406 on the posts 404 are generally about one third up from the base 402, but the position can vary based on user needs, such as the maximum height of the laptop to be held in place, the reaching distance of the user while in a seated position, and resistance to tipping of the laptop or tablet if placed too high on the holder. At least about 2" of clearance should be provided for connectors and cables above the top surface of the base 402 (i.e. the contact point of the straps should be at least 2" above the top surface of the base). As an alternative, and to improve clearance without increasing posts 404 height, the base 402 can have a central recess underneath the straps 406.

While the straps can be square shaped, it is preferable to have round straps to maximize device ventilation. Further, the diameter of each strap should be large enough to avoid wedging between and potentially breaking plastic vent fins on the laptop.

The posts and straps 404 and 406 lateral spacing must be wide enough to provide stable support when a user places the device off-center. If spacing is too wide, small devices may miss straps 406 on one side and fall between the straps 406. When the spacing is too narrow, the straps do not provide enough tolerance for devices placed off-center and larger devices may tilt and fall. The holder 400 is not intended for devices of less than about 7" wide as these pocket-sized devices can be placed on the arm of the chair or sofa itself. Empirical testing indicates that for practical use, the spacing should be between about 24% and 72% of the width of supported devices. A limiting factor is that a hand must fit between the posts 404 when grasping smaller devices. Widths less than about 5" are uncomfortable for a hand. This limiting factor could be eliminated by splaying the posts 404 outward at the top to allow room for the hand while maintaining narrow strap spacing. The lateral spacing for vertical posts 404 should be between 3" and 7" with 5" spacing being preferred.

With adequate weight in the base 402 (and/or footprint), the posts 404 can be made as tall as 2' (two feet), however, the laptop is vulnerable to damaging falls if bumped accidentally. Additionally, the large base 402 required for stability diminishes the advantage of the holder over a conventional small table. The minimum height of the post 404 is limited by electrical cable clearance when a laptop is placed with connected cables facing downward; particularly with laptops having a bulky connector that is centrally located.

If a tall holder is desired, a large base 402 could provide height and double as a stowage compartment, subwoofer, etc. provided the width of the base is long enough to break the fall of the device in case of lateral slippage.

Figure 6A:
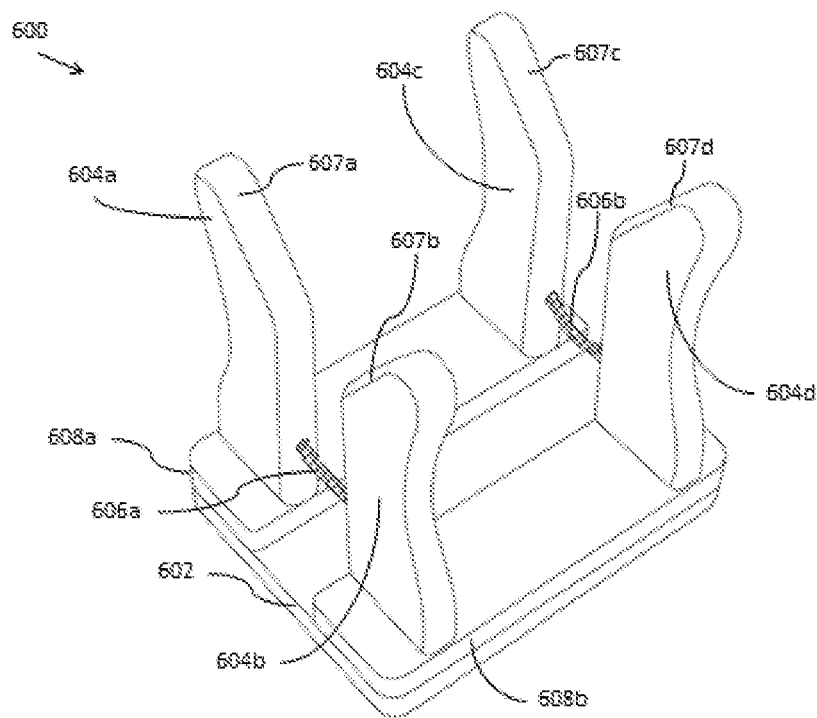
FIG. 6A illustrates an alternate schematic representation of the device holder wherein the outer edges of the posts are curved and the inner top portions of the posts have slant edges.
Figure 6B:
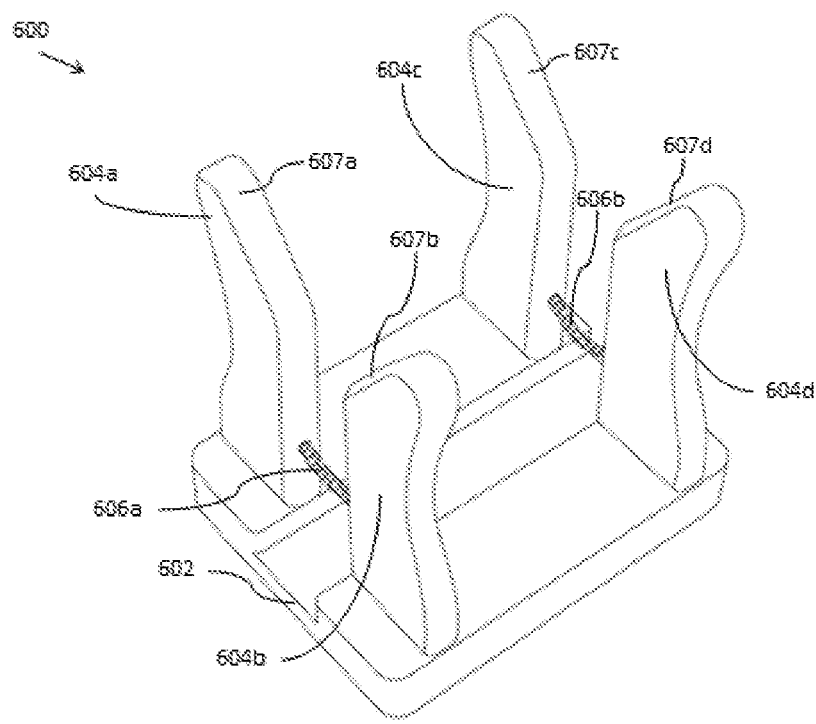
FIG. 6B illustrates an alternate schematic representation of the device holder wherein the outer edges of the posts are curved, and the inner top portions of the posts have slant edges.
Figure 6C:
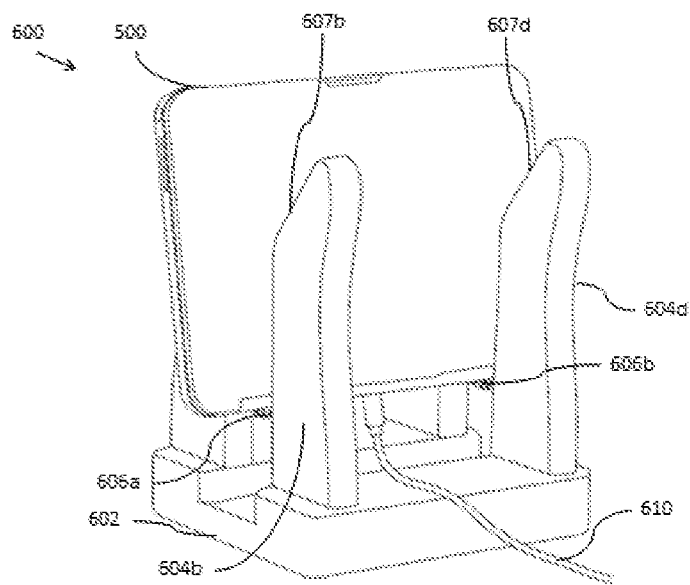
FIG. 6C illustrates an alternate schematic representation of the device holder wherein the device holder holds the laptop of FIG. 5.
Figure 6D:
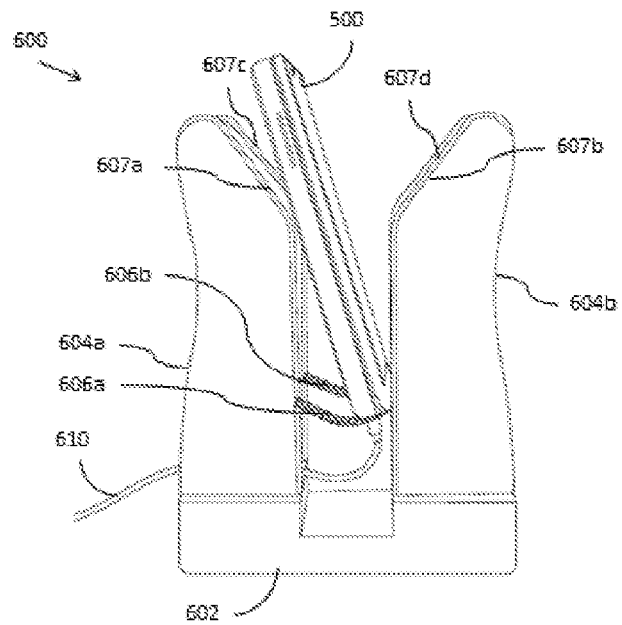
FIG. 6D illustrates a perspective view of FIG. 6C.
Figure 6E:
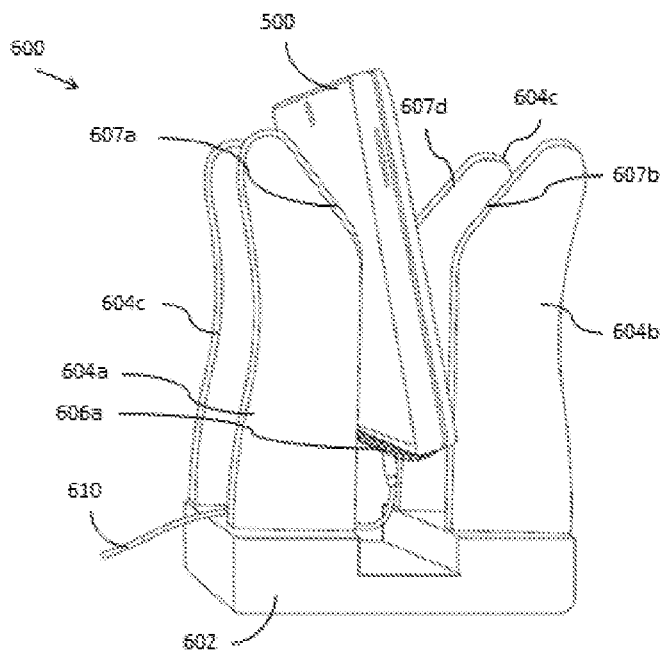
FIG. 6E illustrates a perspective view of FIG. 6C.
Figure 7A:
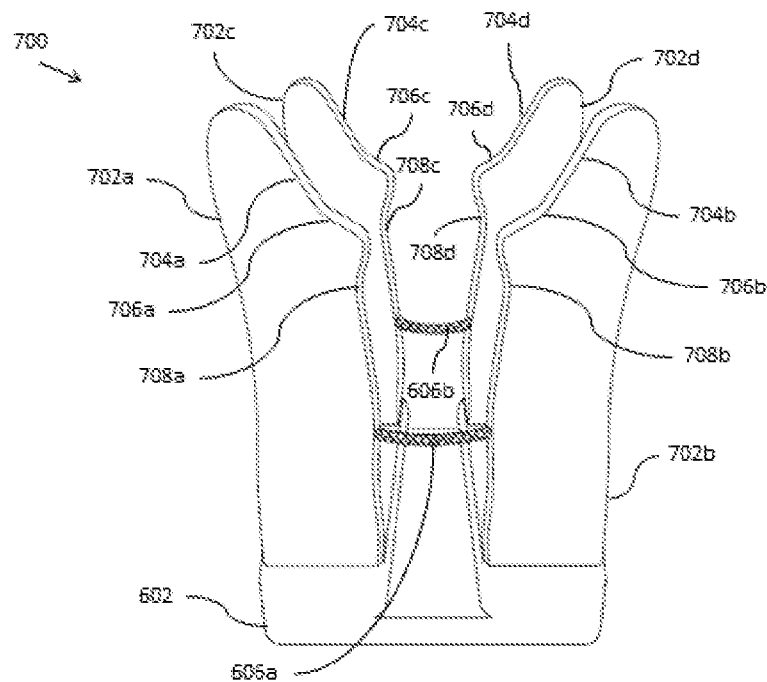
FIG. 7A illustrates a perspective view of a schematic representation of the device holder, wherein the top and the inner edges of the posts have a curvature.
Figure 7B:
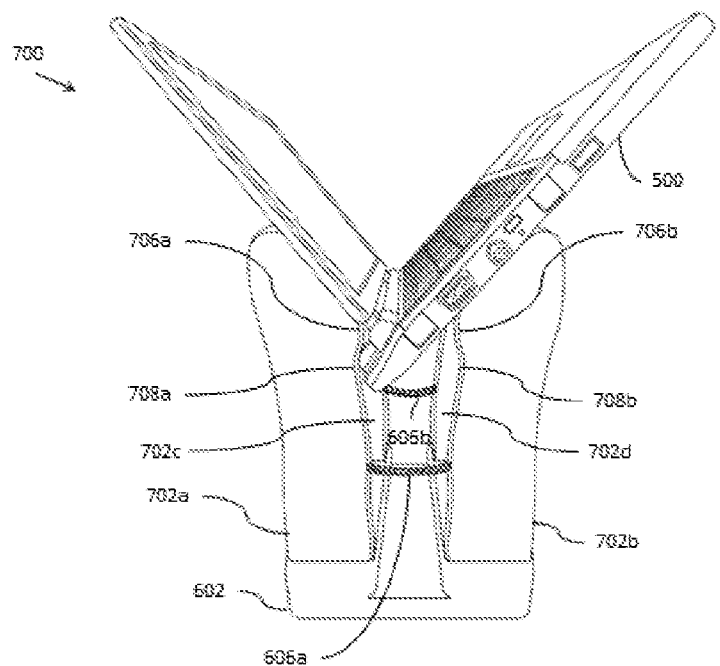
FIG. 7B illustrates a perspective view of FIG. 7A holding an open laptop.
Figure 7C:
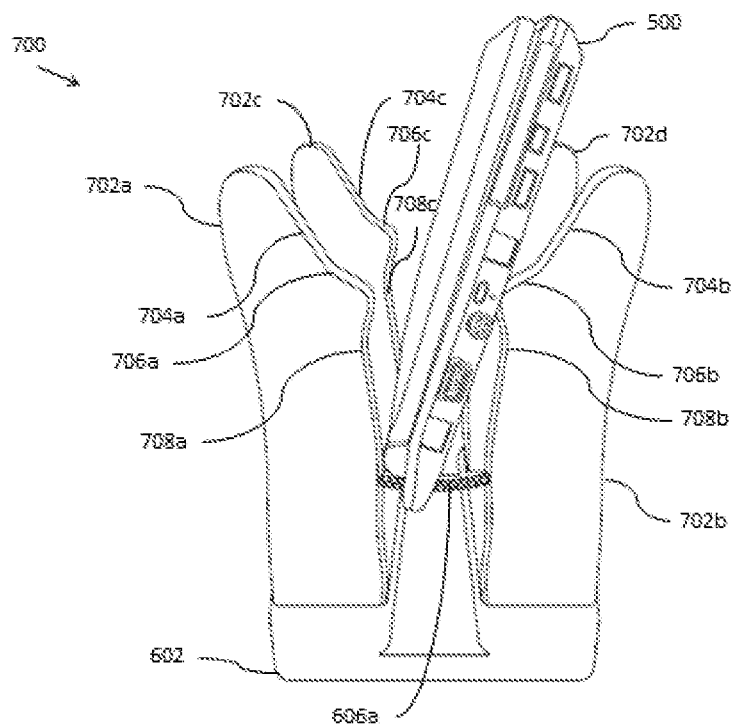
FIG. 7C illustrates a perspective view of FIG. 7A holding a closed laptop.
Figure 7D:
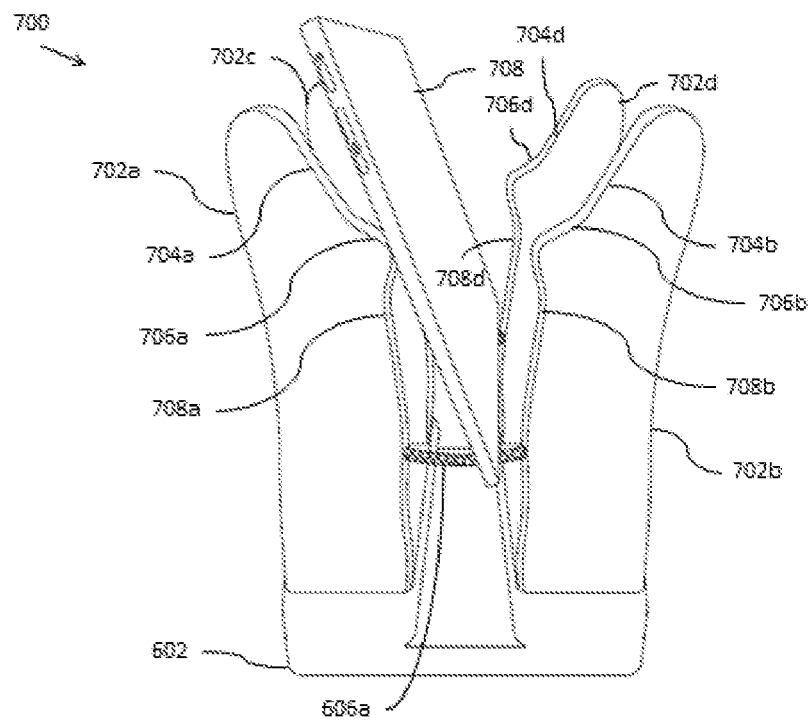
FIG. 7D illustrates a perspective view of FIG. 7A holding a tablet in a vertical position.
Figure 7E:
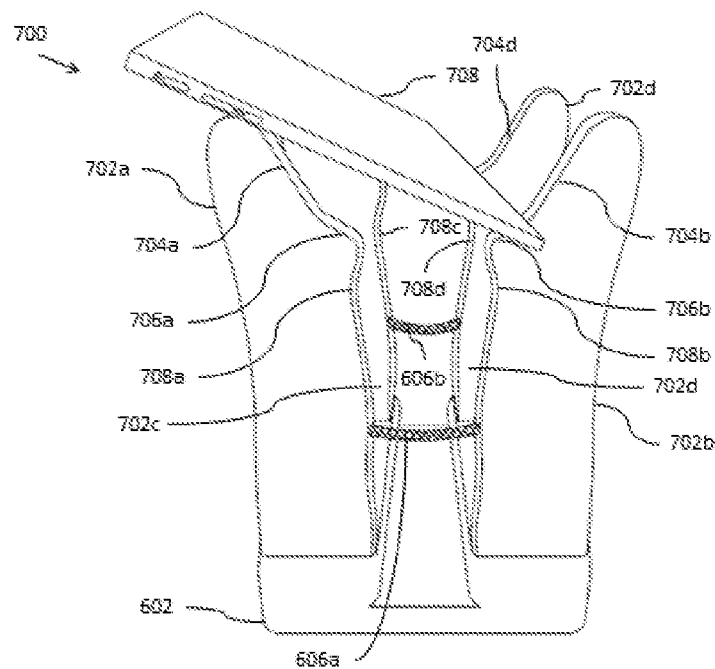
FIG. 7E illustrates a perspective view of FIG. 7A holding a tablet in a horizontal position.

FIGS. 6A-6E and 7A-7E are illustrations of different embodiments of the present invention. The figures show different implementations of the device holder 400 shown in FIG. 4 based on the placement of the device posts 404 and different curved edges thereof in accordance with various embodiments of the present invention. FIG. 6A is a representation of the device holder 600, wherein the outer edges of the posts 604a-604d (collectively referred to as posts 604) are curved and the top of the posts 604 have a slant. FIG. 6B illustrates an alternate schematic representation of the device holder 600 wherein the outer edges of the posts are curved, the inner top portions of the posts have slant edges. FIGS. 6C-6D illustrate perspective views of the device holder 600 of FIG. 6B holding a laptop along with a cord attached thereto. FIG. 7A is a representation of the device holder 700 wherein top and slant-like edges of posts 702a-702d (collectively referred to as posts 702) are notched. FIG. 7B illustrates a perspective view of the device holder 700 holding the laptop 500 in an open position. FIG. 7C illustrates the device holder 700 holding the laptop 500 in a closed position. FIG. 7D illustrates the device holder 700 holding a tablet in a vertical position, and FIG. 7E illustrates the device holder 700 holding a tablet in horizontal position.

The device holder 600, shown in FIG. 6A, illustrates a base 602 with elevated posts 604 wherein the posts 604 are fastened to base 202 using mortise and tenon joints. The four posts 604 are respectively labeled 604a-604d. Further, first and second straps 606a and 606b (referred to as straps 606) are connected between the posts 604 as shown in FIG. 6A. The posts 604 include slant-like edges 607a-607d (also referred to as slant-like edges 607) and are placed over first and second support bars 608a and 608b (collectively referred to as support bars 608). The posts 604 and the straps 606 hold the device in the open and closed positions, respectively.

FIG. 6B illustrates an alternate embodiment of the device holder 600 that is devoid of the support bars 608. The base 602 has an optional channel carved in it to provide space for the cables and cords, and extra room for ventilation of the device. Such a base is preferred when the device holder is made using plastic or metal as the base would be monolithic.

FIG. 6C, FIG. 6D, and FIG. 6E illustrate alternate embodiments of the device holder 600 that holds the laptop 500 along with a cord 610 attached thereto. As seen in the FIGS. 6C, 6D, and 6E, the placement of the first and second straps 606a and 606b is such that cords, cables, and various computer attachments of the laptop 500 are allowed enough space for ease in stowage and ventilation. The cords, the cables and the computer attachments of the laptop 500 are elevated from the floor. Moreover, the device holder 600 allows efficient functioning of ventilation ports of the laptop 500.

FIG. 7A discloses a perspective view of the device holder 700 wherein the posts 702 have curvatures for securing devices in positions not available with the device holder 400. Here, the four posts 702a-702d (referred to as posts 702) include slant-like edges 704a-704d, respectively, having a curvature there along the top, with notches 706a-706d (also referred to as notches 706), respectively, in the slant-like edges 704a-704d. The inner edges of posts 702a-702d include recesses 708a-708d (also referred to as recesses 708), respectively.

As shown in FIG. 7A, some laptops have a lid hinge located some distance away from the edge of the laptop. This causes a portion of the laptop case to extend beyond the lid when in the open position. This extension may interfere with the straight posts of the device holder 400. The recesses 708 accommodate the extension and allow the laptop in open position to rest as intended on the slant-like edges 704. The recesses 708 are smooth and shallow to prevent damage if such a laptop in the open position were forced open wider. To ensure the extension will not become trapped in the recesses 708, no tangent along recesses 708 shall exceed about 25° from vertical.

FIG. 7B illustrates a perspective view of the device holder 700 holding the laptop 500 in the open position. The laptop 500 is placed over the posts 702 and supported by the slant-like edges 704. When the laptop 500 is placed in the open position, a preferred opening angle of the laptop 500 is about 67°. When the opening angle is smaller than 67°, laptops with weak hinges tend to close under their own weight and slip down. As for angles larger than 67°, the laptop 500 occupies a larger horizontal footprint (or area) when opened wider. Thus, one must place the holder 700 farther away from nearby furniture (particularly with large laptops). Wider openings may also necessitate a wider and/or a heavy base 602 for stability. The slant-like edges 704 and the recesses 708 are constructed to provide maximum contact and stability with the laptop 500 at the preferred opening angle. The curvature of the tops of posts 702 allow a range of opening angles to facilitate placement without scratching or damaging the laptop. Rounded edges of the posts 702 allow ventilation, and avoid or minimize potential overheating, which can result in reduced lifespan of the device, failure, or even fire.

Moreover, the open laptop position allows continued operation and access to the keyboard for limited use (for example, to confirm shutdown has completed, monitor a download, etc.). Further, as shown in FIG. 7D, the tablet 610 may be placed in a vertical position when not in use.

FIG. 7E illustrates a perspective view of the device holder 700 holding a tablet 708 in the horizontal (viewable) position. Gravity keeps the bottom edge of the tablet 708 secure in notches 706. Since the notches 706 also serve to guide devices when placed in the vertical position, a sufficiently vertical angle must be maintained to provide smooth operation. No tangent along the notches 706 should be more than about 60° from vertical. Wider posts 702 are necessary to support large tablets in the horizontal (viewable) tablet position. It is recommended that the post width be sufficient to safely and securely support a tablet in viewable position (contact points span 50% of the tablet height). The holder 700 with about 2¼" wide posts 704 and about 1¾" gap between the posts 704a and 704b, as well as the posts 704c and 704d is ideal to support tablets up to 9" in height in the viewable position.

An embodiment for the device holder 700 has the following dimensions: base 602 is 8"×6.5"; the posts 702 are spaced 5" and 1.75" apart, and have a post width of about 2", and are less than two feet (2') tall.

In another embodiment, the first strap 606a is connected between the first and third posts 702a and 702c and the second strap 606b is connected between the second and fourth posts 702b and 702d (not shown). In such an arrangement, multiple laptops and tablets may be placed in a closed position over the straps 606 at a time. Thus, the use of the holder is not restricted to a single device only. In another embodiment, the holder includes four straps connected to each of the four posts 702. Thus, it is at the user's discretion to use the holder for a single device only or multiple devices and may require devices to be placed such that no connected cables face downward.

In an alternate embodiment, the height of the posts may be made adjustable using well known telescoping, slide and lock mechanisms in the art. Thus, based on the user preference, the user can adjust the height of the posts improving accessibility of the laptop or tablet when placed thereon. Further, two of the posts may include equally spaced multiple notches such that a tablet can be placed at different viewing angles in a horizontal position. The viewing angles of the tablet may be adjusted by resting the tablet on different notches.

In yet another embodiment, the slant-like edges of the posts may be hinged to the posts, using hinge mechanisms known in the art. The hinge allows the slant-like edges of the posts to rotate along a vertical axis of the posts. When the slant-like edges of the four posts are rotated and maintained at an angle of 90°, either inwards or outwards, the laptop or tablet can be placed in an open position for normal use by the user. Thus, the device holder can be transformed to provide support for placement of the laptop like a conventional table top. Further, as the slant-like edges can be maintained at different angles, the laptop can be held at multiple opening angles. Moreover, the device holder can function as a small table, by using the posts as support and the base as the table top. Such a holder has multipurpose functionality.

In yet another embodiment the slant-like edges of the posts are made with asymmetrical angles and/or asymmetrical heights to allow normal use at a 90+ degree opening. Further, in such a configuration the tablet may be placed in a horizontal position without the use of notches 706.

In yet another embodiment, the posts of the device holder are detachable. When not in use pairs of posts attached to each other by way of the straps may be detached from the base, thus, reducing the stowage space required of the device holder. Further, such a device holder is more easily portable or transportable.

In yet another embodiment, the posts may be hinged to the base using hinge mechanisms known in the art. Thus, foldable posts again increase the portability of the device holder and reduce the stowage space thereof.

Figure 8:
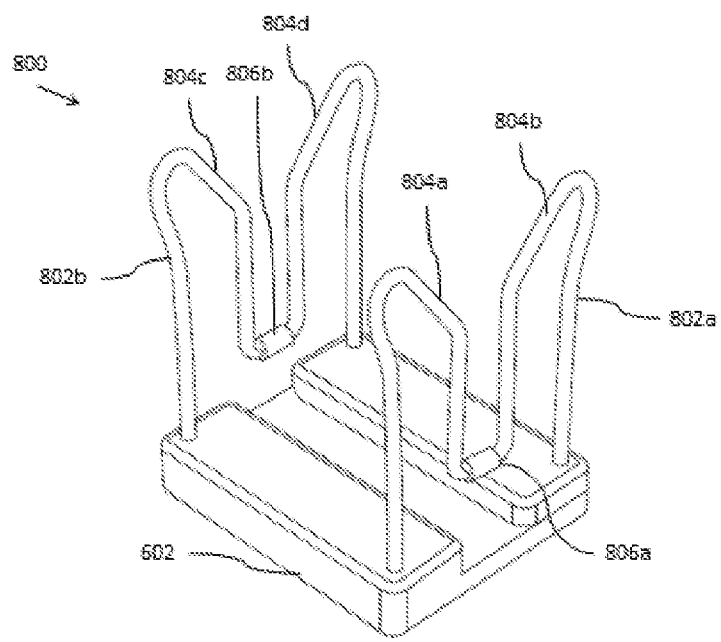
FIG. 8 illustrates a perspective view of an alternate schematic representation of a device holder.
Figure 9A:
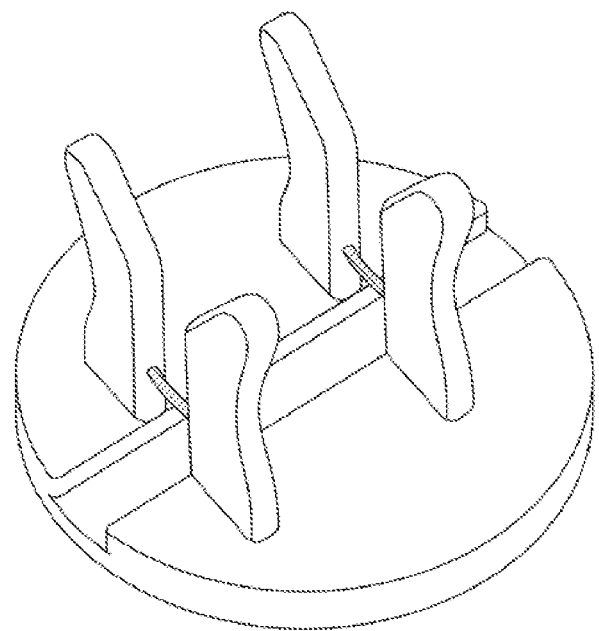
FIG. 9A illustrates a perspective view having a circular base.
Figure 9B:
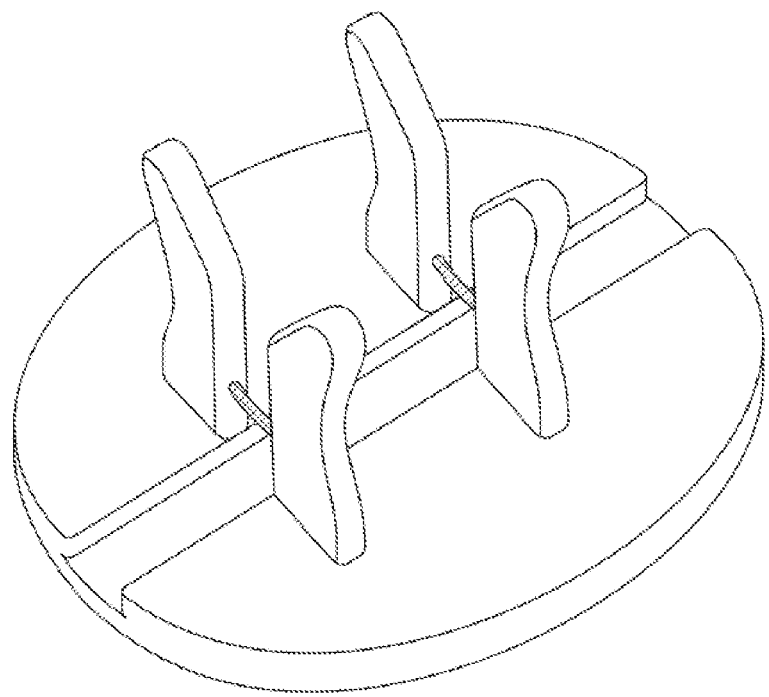
FIG. 9B illustrates a perspective view having an oval base.

FIG. 8 illustrates a device holder 800 that has a base 802, first and second tubular posts 802a-802b (collectively referred to as tubular posts 802), first through fourth slant-like edges 804a-804d (collectively referred to as slant-like edges 804), first and second rubber cushions 806a-806b (collectively referred to as rubber cushions 806). Each of the tubular posts 802 represents two posts and a strap of the previously described embodiments. The tubing provides flexibility to help absorb shock, and the rubber cushions 806 absorb shock and prevent scratching due to contact with the devices.

Advantages of the inventive holder described include protection of the device from foot traffic and floor cleaners such as vacuum cleaners and mops when the devices are kept on the floor. Moreover, the holder is small and portable and occupies less space than conventional placements. The present holder is capable of holding the device in multiple positions and angles. Further, the present holder holds the device in such a manner that the cords, the cables and the computer attachments of the device are elevated from the floor. It is recommended that the device be placed on the holder such that the cords and cables do not come in contact with the straps. The holder allows the cords of the device to stay connected even when the device is resting on the device holder in a vertical position. Further, the device holder allows ventilation ports of the laptop to function efficiently. The device holder can accommodate computer laptops of a wide spectrum of sizes, shapes, and thicknesses. A single static configuration can accommodate nearly all laptops.

The present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claim.

What is claimed is:

1. An apparatus to secure an electronic device, comprising:
   a base;
   a first post, a second post, a third post and a fourth post each having a slant edge directed towards the interior of the base and are each separately attached to the base whereby the posts secure the electronic device there between;
   first and second straps, wherein the first strap is connected between the first and second posts and the second strap is connected between the third and fourth posts forming a substantial U-shaped opening between the posts, wherein further the straps are each connected 2" above the top surface of the base allowing the electronic device to be placed and secured on top of the straps, while having sufficient area beneath the electronic device to allow space for any cables attached to the electronic device, and the first, second, third, and fourth posts forming the U-shaped opening are sufficiently apart so there is clearance between the secured electronic device and at least one of the posts when the secured electronic device is placed on the straps.

2. The apparatus of claim 1 wherein the electronic device includes at least one of a laptop, a mobile phone, and a tablet.

3. The apparatus of claim 2, wherein the first, second, third, and fourth posts secure the laptop in an open position.

4. The apparatus of claim 2, wherein the first, second, third, and fourth posts secure the tablet in a horizontal position.

5. The apparatus of claim 2, wherein the first, second, third, and fourth posts secure the laptop in a vertical position.

6. The apparatus of claim 1, wherein the first and second straps each are made of leather.

7. The apparatus of claim 1, wherein the apparatus is made of at least one of wood, plastic, metal, chrome, brass, chromium alloy, nickel alloy, stainless steel, iron, aluminum, and rigid copper.

8. The apparatus of claim 1, wherein the slant edge includes at least one of a linear slant edge and a notch.

9. The apparatus of claim 1, wherein the base includes first and second support bars for the first, second, third, and fourth posts.

10. The apparatus of claim 9, wherein the first and second bars are placed along a periphery of the base and are opposite to each other.

11. The apparatus of claim 1, wherein the base is one of a rectangular base, a square base, oval, and a circular base.

12. The apparatus of claim 11, wherein the base is square and the four posts are each secured at the corners of the base.

13. The apparatus of claim 11, wherein the base is circular.

14. The apparatus of claim 1 wherein base includes a channel in the center thereof.

15. The apparatus of claim 2 wherein the base sits on a floor.

16. The apparatus of claim 15 wherein the electronic device is a laptop and further wherein the apparatus is used for stowage of the electronic device.

17. The apparatus of claim 7 wherein the posts are made from metal and the base is square made from wood.

18. The apparatus of claim 1 wherein the U-shaped opening is 1.75" wide.

19. The apparatus of claim 1 wherein a spacing between the first and second posts, and the third and fourth posts respectively is between 24% and 72% of a width of the electronic device.

* * * * *